(No Model.) 3 Sheets—Sheet 1.
G. H. BABCOCK, S. WILCOX & N. W. PRATT.
APPARATUS FOR HEATING WATER FOR BOILERS, &c.
No. 265,234. Patented Oct. 3, 1882.
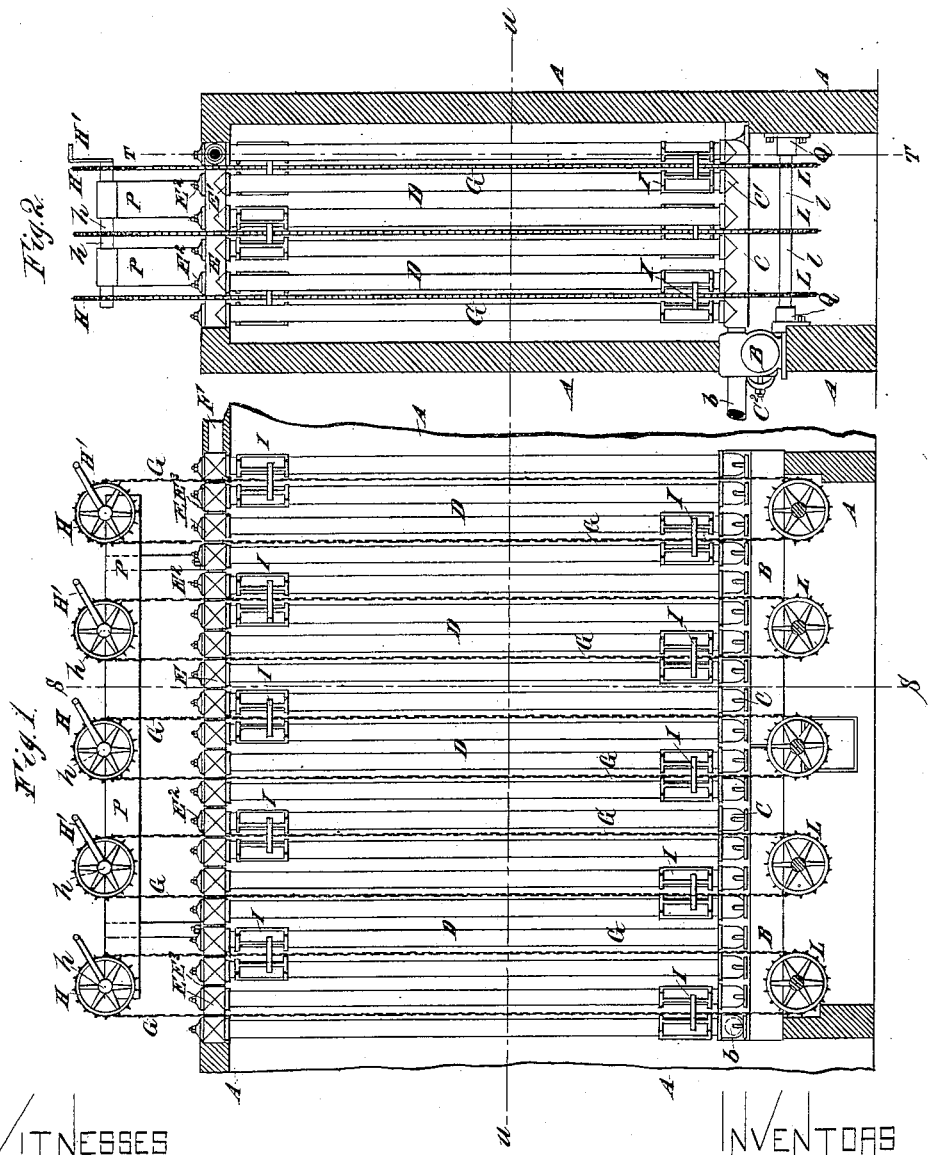
Witnesses
Charles R. Searle,
B. E. D. Stafford.
Inventors
G. H. Babcock
S. Wilcox
N. W. Pratt
by their attorney
T. L. Seeton

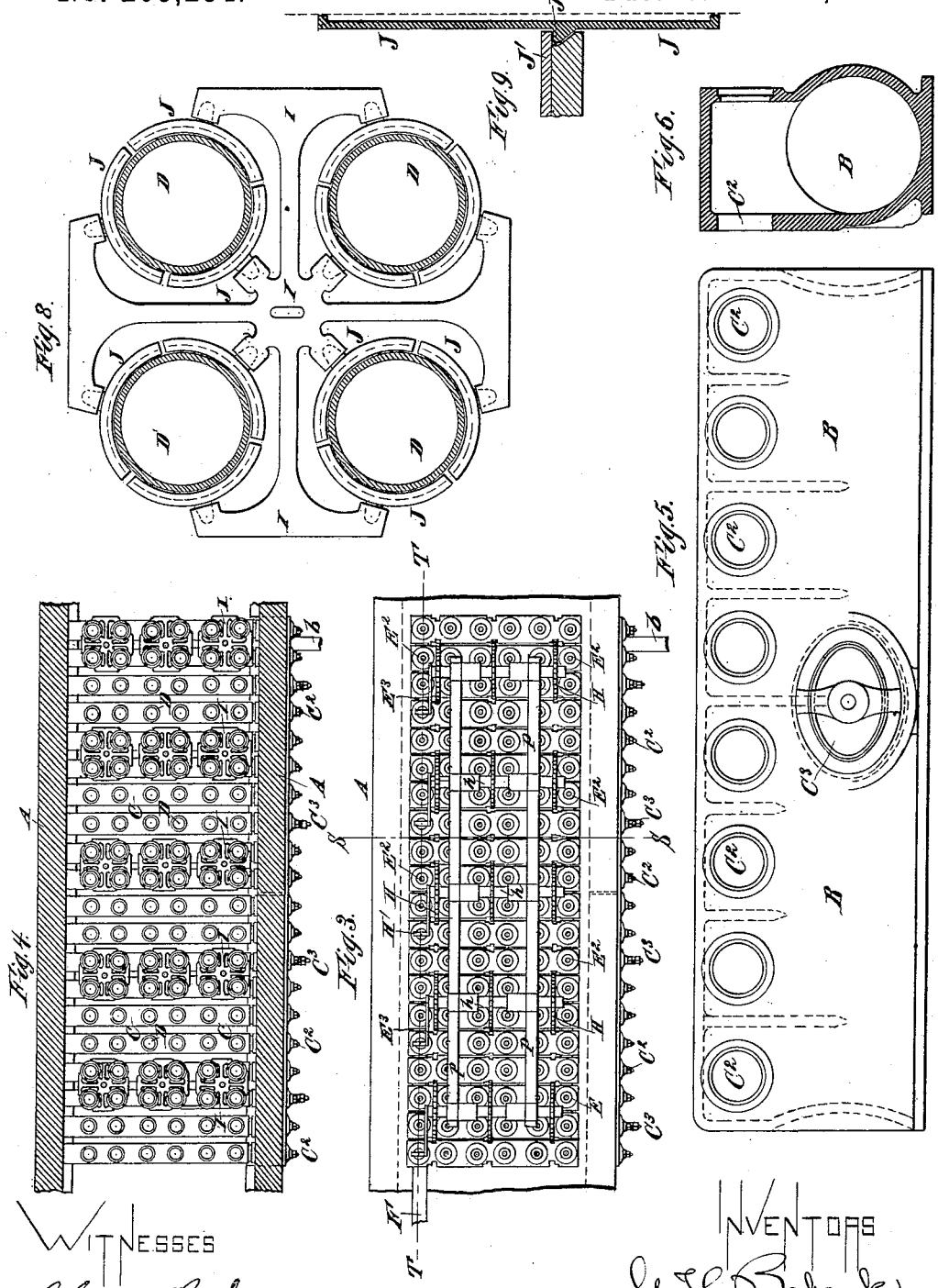

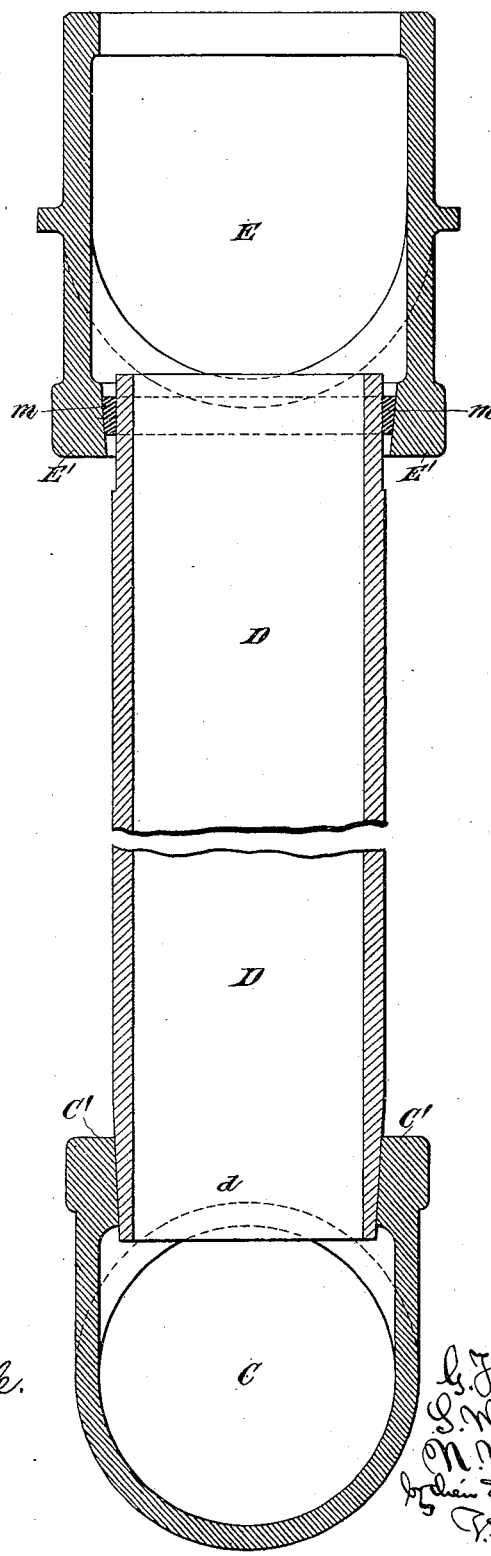
(No Model.) 3 Sheets—Sheet 3.
G. H. BABCOCK, S. WILCOX & N. W. PRATT.
APPARATUS FOR HEATING WATER FOR BOILERS, &c.
No. 265,234. Patented Oct. 3, 1882.

UNITED STATES PATENT OFFICE.

GEORGE H. BABCOCK, OF PLAINFIELD, NEW JERSEY, AND STEPHEN WILCOX AND NATHANIEL W. PRATT, OF BROOKLYN, NEW YORK, ASSIGNORS TO THE BABCOCK & WILCOX COMPANY, OF NEW YORK, N. Y.

APPARATUS FOR HEATING WATER FOR BOILERS, &c.

SPECIFICATION forming part of Letters Patent No. 265,234, dated October 3, 1882.

Application filed September 3, 1881. (No model.)

*To all whom it may concern:*

Be it known that we, GEORGE H. BABCOCK, of Plainfield, Union county, in the State of New Jersey, and STEPHEN WILCOX and NATHANIEL W. PRATT, both residents of Brooklyn, Kings county, in the State of New York, all citizens of the United States, have invented certain new and useful Improvements relating to Apparatus for Heating Water for Feeding Boilers and other Purposes, of which the following is a specification.

We term our apparatus an "economizer." It is adapted to utilize the heat in the spent products of combustion from the furnace of a steam-boiler or other furnace. We provide a large amount of heating-surface, allowing unusual freedom for expansion and contraction, and arranged to allow liberally for the passage of the gases. We provide for efficiently and conveniently cleaning the surfaces at short intervals without interrupting the work. The water may, under some circumstances, be partially heated by the spent steam before the water is passed into our apparatus.

Our apparatus is formed of a series of tubes, through which the water is circulated, arranged in sets, placed in an enlarged horizontal portion of the outlet-flue, near the furnace. These tubes are arranged at proper distances apart to allow of the hot gases passing between them with but little obstruction. These tubes are fitted with connections at the top and bottom, so arranged that the water will circulate positively, but not too rapidly to allow of any sediment therein collecting in the mud-drum provided at the bottom.

We have provided efficient means for scraping at proper intervals the ashes and soot which may collect on the tubes by means of frames or carriages which are impelled positively by endless chains running over sprocket-wheels above and below the tubes. Each of these carriers impels a proper number of scrapers, which are formed of proper shape to efficiently remove any collection of foreign material.

Our mode of fastening the tubes in the connections at the top and bottom is simple and effective. The lower end of each tube is tapered to fit the accurately-formed socket in the bottom connection, and is entered through the large hole in the top connection and urged forcibly to its seat. It is then fastened to the top connection by driving a ring of soft iron—which has been previously formed to approximately fit the cylindrical outer surface of the upper end of the tube and the inner tapering surface of the hole in the top connection—until it completely fills the tapering space around the tube. Our arrangement allows of slight variation in the length of the tubes or in the position of the top and bottom connections, and is easily put together, and free from danger of being blown out by the pressure of the steam, as the pressure tends to fasten it tighter.

The accompanying drawings form a part of this specification.

Figure 1 is a vertical longitudinal section on the line T T in Figs. 2 and 3. Fig. 2 is a vertical cross-section on the line S S in Figs. 1 and 3. Fig. 3 is a plan view, and Fig. 4 a horizontal section on the line *u u* in Figs. 1 and 2. The remaining figures represent certain portions on a larger scale. Fig. 5 is a front view, and Fig. 6 a cross-section, of what we term the "mud-drum" at the base. Fig. 7 is a vertical section through one of the tubes and of the castings employed at the upper and lower ends. These parts are shown on a larger scale, the main body of the tube being omitted. Fig. 8 is a plan view of one group of scrapers and their carrier, being a section through the four tubes against which they apply. Fig. 9 is a central vertical section through one of the scrapers and part of the carrier.

Similar letters of reference indicate like parts in all the figures.

A is the masonry—ordinary brick-work.

B is what we term a "mud-drum." It is of cast-iron, built in one of the walls, and serving as a receiving-chamber for the water and a place of deposit for mud or solid matter, to be cleaned out at intervals. It receives at one end the cold water through a pipe, *b*, from the feed-pump. (Not shown.)

C C are a series of horizontal bottom pipes or hollow castings, extending across from the upper portion of the mud-drum B and resting on a shoulder or offset in the masonry of the opposite wall. Each pipe C is provided with six sockets, C', on its upper side. Hand-holes are provided on the mud-drum opposite the end of each tube C, as shown, secured by covers C², which allow access to the interiors when required, and larger hand-holes C³ are provided at intervals.

D D, &c., are pipes fitted tightly in the connections C' of the pipes C, and also in the connections E' of nearly corresponding but larger pipes E, which extend across the apparatus at the top, and fit closely against each other and also against the masonry walls, but with freedom to rise and sink as the varying expansion may require. Each top pipe E is formed with a series of hand-holes on its upper side, secured by strong and tight-fitting covers E², held by nuts and bolts taking hold of the cross-pieces within. (Not represented.) This allows access to the interior when required. All the top pipes E are connected at their corresponding ends by short thimbles E³, which form in effect a continuous longitudinal pipe. To the pipe E farthest from the inlet is connected an eduction-pipe, F, which leads to any point where the heated water is required.

As shown in Fig. 7, the hand-holes in the top castings, E E', are made large enough to allow the insertion and removal of the tubes D. We effect a tight junction of each tube D with the bottom connecting-pipes C by forcibly urging each tube downward until its tapered end $d$ fits tightly into the correspondingly-tapered socket C'. The upper end of the tube is turned true and finished without taper. The opening in the part E', which holds the tube, is accurately tapered, large end upward, and a correspondingly-tapered ring, $m$, of soft wrought-iron, is forced down and tightly fills the space all around between the tube and the casting. This is hammered tight with a calking-iron, so as to completely fill the space. When in use the pressure is always downward on this ring.

It will be observed that there is nothing to prevent the top castings, E E', from rising and sinking, as required by the varying expansion. They may move freely not only relatively to the masonry A, but also to a limited extent relatively to each other. If some of the tubes D receive cold water while others are filled with water at the highest temperature, they can assume a length corresponding to the temperature of their contents. It is easy to see that in the original setting of the tubes our invention allows a considerable range of variation. If the castings E E' come higher than was anticipated, it simply results that the ring $m$ comes to a tight bearing nearer the extreme end of the finished cylindrical part at the extremity of the tube D.

P is a framing, of cast-iron or other suitable material, supported on the top pipes, E, and forming bearings for the scraping mechanism.

G G are endless pitch-chains depending from corresponding wheels, H, mounted on shafts $h$, and turned, when required, by cranks H'. We have shown three wheels H and three chains G on each shaft $h$. Each chain G carries two carriages, I, each of which, with its connections, is adapted to scrape four of the upright tubes D by being simply raised and lowered by turning the shafts $h$.

Q Q are castings mounted in the empty space below the tube C, and forming bearings for shafts $l$, supporting idle-wheels L, which receive the pitch-chains G, connected to the center of each scraping-carriage I, as shown. It follows that when by means of the crank H' or by other efficient means any set of wheels H at the top are turned in the direction to elevate a given carriage I, and consequently a given set of scrapers, and allow the opposite set of scrapers to descend, the motion of the rising scrapers is transmitted positively through the chain G and wheel L to the opposite scrapers, and thus their corresponding descent is insured.

The scraping-carriages balance each other. Turning the shaft either way raises one series of scrapers and lowers the other. Each scraping-carriage is composed of the carrier I, having four short arms and four long arms. The short arms carry each a scraper, J, to clean a third of the circumference of the corresponding tube. Each long arm is T-shaped, and carries two scrapers, J, each adapted to act on a third of the circumference of its tube. The scrapers J have beveled spurs or offsets, $j$, which fit loosely in correspondingly-formed sockets in the carriage I, and the scrapers are held in place by a flat top plate, J', which is shaped to approximately conform to the contour of the carrier I, to hold the spurs $j$ of the scrapers J confined in their recesses in the carriage. The spurs $j$ are formed as shown, making an oblique shoulder on their lower side and a square shoulder on their upper side. Each top plate is bolted to its respective carriage at the proper points. Each scraper, J, extends a little up and down the tube and scrapes at two levels, as shown, thus obtaining a long bearing on the tube. When the carriage I is caused to descend the scrapers J are pushed by the square shoulders of the spurs $j$, and their pressure against the respective tubes is insignificant; but when the motion is ascending the carrier I acts with its inclined surfaces on the correspondingly-inclined shoulders of the spurs $j$ and urges the scrapers J forcibly against the tubes, so as to scrape them effectively. The soot tending to accumulate on the cool tubes is by this means cleared off and allowed to fall as loose dust. The cross-tubes C are placed at a sufficient distance apart to allow the loose soot to fall through the spaces. A sufficiently-capacious chamber is provided below, and may be cleaned at intervals through the door, as represented in Fig. 1.

The pipe $b$ delivers the water to the apparatus at one end through the mud-drum, and it circulates through all the pipes C and D which are connected with that half of the mud-drum. The water is delivered into the other half of the apparatus through one of the short thimbles E³ at the top, between the adjoining pipes E, which are connected with their respective sets of pipes D, and is at liberty to proceed directly through the line of thimbles E³ to the farther end of the apparatus, or to descend in any of those pipes, and thus make a more or less active circulation in that part of the apparatus before being discharged through the exit F.

Modifications may be made in many of the details. The pipes D may be longer or shorter than represented. A greater or less number of scrapers may be connected together and operated by a single chain, G. The connection of tubes D to the upper pipes, E, may be effected by tapering the end of the pipe D and having the hole in the pipe E cylindrical, or by tapering both slightly and making the soft ring $m$ to correspond.

It is not essential that the inclosing walls be masonry; but we esteem it important that a more than usually liberal space be provided for the passage of the gases, and that a sufficient length be given to the pipes D to allow a long traverse of the scrapers; also, that the top connections, E E', be fitted approximately gas-tight, while free to shift their relative positions vertically to allow for expansion and contraction, and also that the bottom connections, C C', be open-spaced to allow the soot to fall through as it is removed by the scrapers.

The apparatus may be used in connection with other furnaces, as in chemical works, for utilizing the spent heat from any kind of furnaces, and warming large quantities of water for any purpose.

We make the mud-drum in two lengths where the apparatus is as long as here shown; but it may be made in one length, if desired.

We claim as our invention—

1. In combination with the upright tubes D, having connections for circulating water therethrough, arranged within the inclosing walls A, to be heated by the spent gases from a furnace, the scrapers J, extending up and down the tubes, with a scraping-surface at each end, and provided near the center with a beveled spur, $j$, engaged by a correspondingly-recessed carrier or carriage, I J', so as to scrape forcibly during the rising motion only, as herein specified.

2. In a feed heater or economizer, the bottom connections C, having tapering sockets C', the top connections E, having tapering sockets E', larger than C', the tubes D, having one tapered end, $d$, and the ring $m$, fitted around the opposite end of the tube and driven tightly in the tapering socket E', as herein specified.

In testimony whereof we have hereunto set our hands in the presence of two subscribing witnesses.

GEO. H. BABCOCK.
S. WILCOX.
NAT. W. PRATT.

Witnesses:
CHARLES A. KNIGHT,
CHARLES C. STETSON.